(12) United States Patent
Müller et al.

(10) Patent No.: US 6,591,459 B2
(45) Date of Patent: Jul. 15, 2003

(54) DEVICE FOR FASTENING EYEGLASSES

(75) Inventors: Rüdiger Müller, Stockelsdorf (DE); Carolin Klesing, Badendorf (DE)

(73) Assignee: Dräger Safety AG & Co., KGaA (DE)

( * ) Notice: Subject to any disclaimer, the term of this patent is extended or adjusted under 35 U.S.C. 154(b) by 0 days.

(21) Appl. No.: 10/020,770

(22) Filed: Dec. 12, 2001

(65) Prior Publication Data
US 2002/0073512 A1 Jun. 20, 2002

(30) Foreign Application Priority Data
Dec. 19, 2000 (DE) .......................... 100 63 210

(51) Int. Cl.⁷ .......................... A44B 21/00; A62B 18/08
(52) U.S. Cl. .................. 24/3.3; 24/3.1; 2/13; 2/442; 2/443
(58) Field of Search .............. 24/3.1, 3.3; 351/131, 351/43, 133, 155; 128/206.12; 2/5, 6.1, 6.3, 6.4, 6.5, 12, 13, 15, 422, 439, 442, 444, 428; 248/231.85, 230.1, 902, 514, 218.4, 229.1, 229.2, 227.3, 227.4

(56) References Cited

U.S. PATENT DOCUMENTS

| | | | | |
|---|---|---|---|---|
| 3,051,957 A | * | 9/1962 | Chan | |
| 3,787,113 A | * | 1/1974 | Shedrow | 351/43 |
| 4,930,163 A | * | 6/1990 | King | 2/444 |
| 5,170,502 A | * | 12/1992 | Hegendorfer et al. | 2/13 |
| 5,247,706 A | * | 9/1993 | Mark | 2/9 |
| 5,929,963 A | * | 7/1999 | McNeal | 351/47 |

FOREIGN PATENT DOCUMENTS

| | | |
|---|---|---|
| FR | 820225 | 11/1937 |
| FR | 854472 | 4/1940 |

* cited by examiner

Primary Examiner—Robert J. Sandy
(74) Attorney, Agent, or Firm—McGlew and Tuttle, P.C.

(57) ABSTRACT

A device for fastening eyeglasses is improved such that the lenses can be adjusted to the eyes of the mask user independently from one another. An ear piece (6) bent in an L-shaped pattern is provided. The earpiece is arranged on a holding element (4), which is located at an edge (1) of an eye-protecting lens (2). A frame (9) with a lens (10) is fastened at the other free end of the ear piece (6) by a displaceable bracket (8).

14 Claims, 1 Drawing Sheet

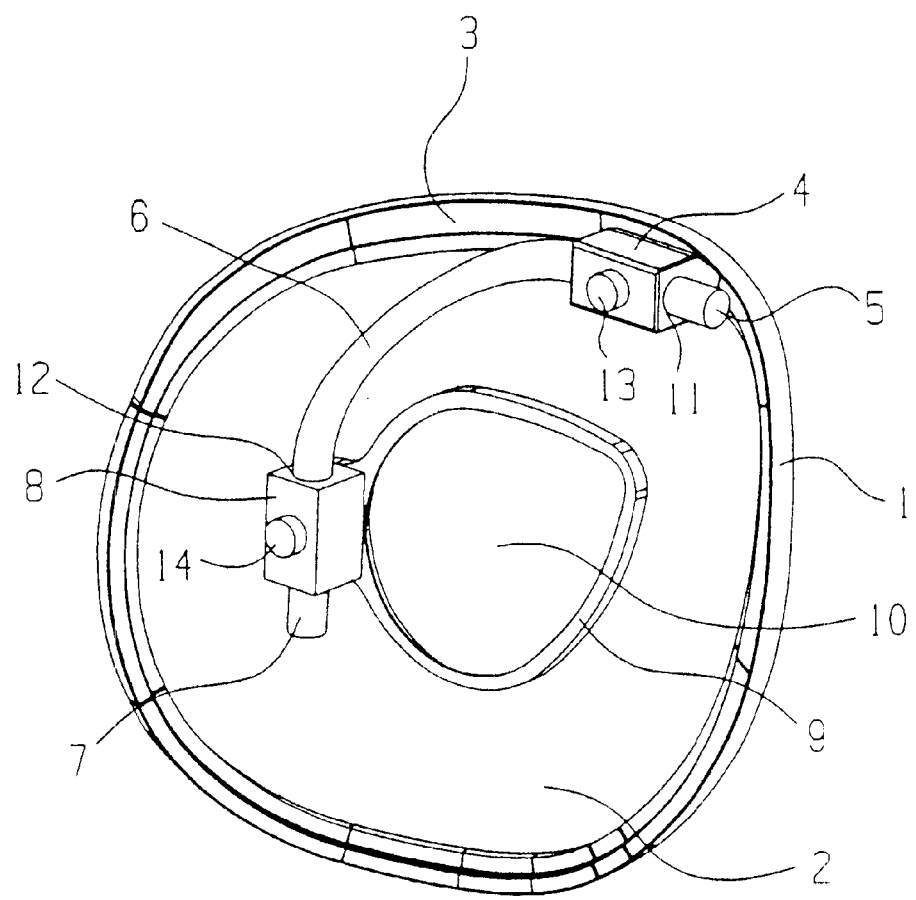

DEVICE FOR FASTENING EYEGLASSES

FIELD OF THE INVENTION

The present invention pertains to a device for fastening a frame for the eyeglasses behind a eye-protecting lens of a gas mask, wherein the frame is fastened to a web with a displaceable bracket.

BACKGROUND OF THE INVENTION

People who wear gas masks and need eyeglasses must also be able to use eyeglasses during the use of the gas mask in order to have full sight available during use. Conventional eyeglasses cannot be used in the normal case, because leaks may develop in the area of the edge of the gas mask due to the ear pieces.

Eyeglasses for a gas mask, in which the eyeglasses are fastened horizontally displaceably to a common web, have been known from FR-PS 820 225. The web is connected to an adjustable bridge, with which the vertical position of the web can be adjusted to the level of the eyes of the user of the mask. By displacing the eyeglasses on the web, the eyeglasses can be adapted to the distance between the eyes.

The drawback of the prior-art device is that the eyeglass holder cannot be used universally for different gas masks, because no unambiguous reference point is available for the bridge, especially in the case of full masks with an inner half mask. In addition, the common web makes difficult the adjustment of the eyeglasses to the eyes of the mask user, because the eyeglasses are only located at the correct level in front of the eyes in case of an exactly horizontal alignment of the web. If the position of the web changes within the gas mask, because, e.g., the bridge has shifted, the gas mask must be removed and the web must be repositioned.

SUMMARY AND OBJECTS OF THE INVENTION

The basic object of the present invention is to improve a device of the above-mentioned type such that the eyeglasses can be adjusted to the eyes of the mask user independently from one another.

According to the invention, a device for fastening an eyeglasses frame behind a eye-protecting lens of a gas mask is provided. A web connects to the frame with a displaceable bracket. The web is a bent ear piece shape such as an L-shaped pattern. A holding element has a mount for the end of the ear piece facing away from the frame. The holding element is disposed along or adjacent to an edge of the eye-protecting lens.

The holding element may be fastened on a top side of the edge. The ear piece may comprise a round material. The holding element and the displaceable bracket may be provided with holes designed corresponding to the round material as mounts for the ear piece.

According to another aspect of the invention a method fastening an eyeglasses frame behind a eye-protecting lens of a gas mask is provided. The frame is fastened to a web with a displaceable bracket. The web is designed as an ear piece bent in an L-shaped pattern. A holding element is provided with a mount for the end of the ear piece facing away from the frame. The holding element is arranged in the area of a edge of the eye-protecting lens.

The advantage of the present invention is essentially that the frame for the eye correcting eyeglasses is fastened by means of an ear piece bent essentially in an L-shaped pattern in the interior space of the mask directly at the edge of the eye-protecting lens and the frame thus always has a fixed reference point to the eye-protecting lens. The frame can be displaced in the vertical direction by means of a displaceable bracket located between the frame and the ear piece, and a holding element at the edge, into which the other free end of the ear piece is pushed, makes possible the adjustment in the horizontal direction.

A corresponding ear piece with a frame for a lens is located in the same manner at the other eye-protecting lens of the gas mask, so that both lenses can be adapted independently from one another to the eyes of the mask user. Another advantage is that the gas mask can be folded up in a simple manner due to the individual fastening of the frames at the edges of the eye-protecting lenses without a change in the adjustment of the frames in relation to the eye-protecting lenses. It may be necessary to fold up the gas mask in order to store or transport it in a protected manner.

The holding element for the fastening of the ear piece is preferably fastened at the edge of the eye-protecting lens. However, the holding element may also be arranged on the mask body if the latter has a sufficient rigidity.

The ear piece is fastened within the holding element or the displaceable bracket by means of a clamping device. The clamping device is designed as a knurled screw in the simplest case, but spring-loaded clamping elements, with which the ear piece is fixed by friction, may also be used as an alternative.

The preferred site of fastening of the holding element is on the top side of the edge. However, it is also possible to arrange the holding element laterally on the edge or on the underside of the edge.

The web or ear piece is advantageously made of a round material, especially at its free ends. As a result, the ear piece can also be rotated within the holding element and the displaceable bracket, so that the frame can be aligned as a result especially well in parallel to the face of the mask user.

An exemplary embodiment of the present invention is shown in the FIGURE and will be explained in greater detail below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only figure shows a perspective view of a an eye-protecting lens portion for a gas mask or protective mask. An eye-protecting lens 2 has an edge 1 with for the gas mask. The view in the figure is in the direction of view toward the left-hand part of the interior space of the mask. A holding element 4 is fastened on the top side 3 of the edge 1. A first free end 5 of a web 6 or ear piece 6 bent in an L-shaped pattern is pushed into holding element 4. A displaceable bracket 8 with a frame 9 for a lens 10 is located at a second free end 7 of the ear piece 6. The ear piece 6 (or the web 6) comprises a round part or part of rounded material. The holding element 4 and the displaceable bracket $ are provided with a hole 11, 12 each, into which the free ends 5, 7 can be pushed and can be fixed by means of a clamping device 13, 14. By displacing or rotating the ear piece 6 within the holding element 4 and the displaceable bracket 8, the position of the lens 10 can be adjusted to the eye of a mask user, not shown in the figure. The frame 9 can be displaced horizontally in the area of the first free end 5 of the ear piece, and adjustment in the vertical position is possible by changing the position of the displaceable bracket 8 at the second free end 7. By rotating the ear piece 6 within the holding element 4 and the displaceable bracket 8, the frame 9 can be aligned in parallel to the eye. Finally, the ear piece 6 can be fixed in relation to the edge 1 with the damping devices 13, 14, which are designed as knurled screws.

In the same manner as is shown in the FIGURE, a holding element 4 for an ear piece web or web bent in an L-shaped pattern is provided for fastening a lens of the right eye of the mask user. This is located at the edge of the eye-protecting lens on a right-hand part of the mask body (right-hand part is not shown in the FIGURE but is substantially the mirror image). Due to the right and left lenses being fastened independently from one another at the left-hand edge 1 and at the right-hand edge, the lenses can be individually adjusted to the eyes.

While a specific embodiment of the invention has been shown and described in detail to illustrate the application of the principles of the invention, it will be understood that the invention may be embodied otherwise without departing from such principles.

What is claimed is:

1. A device for fastening an eyeglass frame to a mask with an eye-protecting lens having an edge, the device comprising:

a holding element with a damping device, the holding element being arranged in the area of an edge of the eye-protecting lens;

a web part having a generally L-shaped pattern, said holding element receiving an end of said web part with said web being movable in said holding element and fixable by said clamping device in a position;

a displaceable bracket for connection to the frame, said bracket being movably mounted along said web part and including a clamping device fixing a position of said displaceable bracket relative to said web part.

2. A device in accordance with claim 1, wherein said holding element is fastened on a top side of the edge.

3. A device in accordance with claim 1, wherein said web part comprises a round part and each of said holding element and said displaceable bracket have an web hole corresponding to the shape of the round part.

4. A device in accordance with claim 2, wherein said web part comprises a round part and each of said holding element and said displaceable bracket have an earpiece mount hole corresponding to the shape of the round part.

5. A device for fastening a holder for eyeglasses behind a window shield of a respirator mask, the device comprising:

an essentially L-shaped bent earpiece with a first earpiece end and a second earpiece end;

a holding element arranged in the area of an edge of the window shield and with a hole and a fastening device for fastening the first earpiece end;

a sliding bracket with a hole and a fastening device for fastening the second earpiece end, whereby the earpiece ends are designed such that they are rotatable within the holes and can be shifted axially.

6. A device in accordance with claim 5, wherein the holding element is fastened at a top side of the edge.

7. An eye-protecting lens mask device for fastening an eyeglass frame to the mask the device comprising:

a holding element arranged in the areas of an edge of an eye-protecting lens, said holding element having a mounting passage;

a web with a first end portion extending in a first direction and having a second end portion extending at an angle to said first direction, said mounting passage receiving said first end portion;

a displaceable bracket for connection to the eyeglass frame, said bracket having a bracket mounting passage receiving said second end portion.

8. A device in accordance with claim 7, wherein said holding element is fastened on a top side of the edge.

9. A device in accordance with claim 7, wherein said web comprises a round part, said bracket mounting passage being round and said mounting passage being round.

10. A method for fastening an eyeglass frame to a mask with an eye-protecting lens having an edge, the method comprising the steps of providing a holding element having a mounting passage;

connecting the holding element in an area of an edge of the eye-protecting lens;

providing an web part with a generally L-shape;

positioning an end of the web part in the mounting passage;

providing a displaceable bracket with a bracket mounting passage;

positioning an end of the web part in the bracket mounting passage; and connecting the displaceable bracket to the frame.

11. A method for fastening an eyeglass frame according to claim 10, further comprising the steps of:

providing the web part with a first end portion extending in a first direction and a second end portion extending at an angle to said first direction;

moving the web part in the first direction relative to the holding element.

12. A method for fastening an eyeglass frame according to claim 10, further comprising the steps of providing the web part with a first end portion extending in a first direction and a second end portion extending at an angle to said first direction;

moving the displaceable bracket relative to the web part in the second direction.

13. A method in accordance with claim 10, wherein the holding element is fastened on a top side of the edge.

14. A method in accordance with claim 10, wherein the ear piece is round in cross section.

* * * * *